United States Patent
Minto

(10) Patent No.: US 10,040,512 B2
(45) Date of Patent: Aug. 7, 2018

(54) ACTUATION DEVICE OF THE CONTROL CABLE OF A FRONT DERAILLEUR OF A BICYCLE

(71) Applicant: CAMPAGNOLO S.r.l., Vicenza (IT)

(72) Inventor: Marco Minto, Mirano (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 15/641,769

(22) Filed: Jul. 5, 2017

(65) Prior Publication Data

US 2018/0009506 A1 Jan. 11, 2018

(30) Foreign Application Priority Data

Jul. 5, 2016 (IT) ................ UA2016A4915

(51) Int. Cl.
*B62M 25/04* (2006.01)
*F16C 1/12* (2006.01)
*B62K 23/06* (2006.01)

(52) U.S. Cl.
CPC ............ *B62M 25/04* (2013.01); *B62K 23/06* (2013.01); *F16C 1/12* (2013.01); *Y10T 74/20402* (2015.01); *Y10T 74/20438* (2015.01)

(58) Field of Classification Search
CPC ........ B62K 23/06; B62K 23/02; B62M 25/04; B62M 25/045; Y10T 74/20438; Y10T 74/20287; Y10T 74/2042; Y10T 74/20402; Y10T 74/2028; F16C 1/12; F16C 1/18

See application file for complete search history.

(56) References Cited

U.S. PATENT DOCUMENTS

| 4,736,651 A * | 4/1988 | Nagano ............... B62M 25/04 74/473.14 |
| 5,829,313 A | 11/1998 | Shahana |
| 6,877,393 B2 | 4/2005 | Takachi |
| 7,150,205 B2 | 12/2006 | Takachi |
| 7,285,064 B2 | 10/2007 | Ichida et al. |
| 7,461,573 B2 * | 12/2008 | Dal Pra ............... B62K 23/06 74/502.2 |

(Continued)

OTHER PUBLICATIONS

Italian Search Report and Written Opinion in Italian Application No. UA2016A004915, dated May 16, 2017, with English translation.

*Primary Examiner* — Jeremy R Severson
(74) *Attorney, Agent, or Firm* — Volpe and Koenig, P.C.

(57) ABSTRACT

A front derailleur actuation device having a cable-winding bush in a casing rotatable about axis (X) in a first angular direction (A) between a first angular position and a last two angular positions to actuate a member mounted rotatable about axis (X) and a stationary member mounted in the casing. Either the rotating member or the stationary member is provided with at least one pointer slidably engaged on a fastening track equipped with a plurality of stop areas provided on the other member. The stationary member or the rotating member provided with the fastening track further comprises at least one further stop area not arranged along the fastening track, said further stop area being engageable by the pointer and being arranged between two successive stop areas of said fastening track, the cable-winding bush passing between two angular positions following the passage of the pointer between two stop areas.

14 Claims, 3 Drawing Sheets

(56) References Cited

U.S. PATENT DOCUMENTS

| | | | |
|---|---|---|---|
| 8,443,697 B2* | 5/2013 | Weiss | B62K 23/06 |
| | | | 74/488 |
| 8,485,060 B2 | 7/2013 | Emura et al. | |
| 8,746,106 B2 | 6/2014 | Miki et al. | |
| 2006/0096404 A1* | 5/2006 | Wessel | B62K 23/06 |
| | | | 74/501.6 |
| 2007/0034037 A1 | 2/2007 | Dal Prà et al. | |
| 2009/0025504 A1 | 1/2009 | Dal Prà et al. | |
| 2015/0210342 A1* | 7/2015 | Fukao | B62K 23/06 |
| | | | 74/491 |
| 2017/0341709 A1* | 11/2017 | Marangon | B62K 23/06 |

* cited by examiner

ACTUATION DEVICE OF THE CONTROL CABLE OF A FRONT DERAILLEUR OF A BICYCLE

CROSS REFERENCE TO RELATED APPLICATION

This application claims the benefit of Italian Application No. UA2016A004915, filed on Jul. 5, 2016, which is incorporated herein by reference as if fully set forth.

FIELD OF INVENTION

The present invention relates to an actuation device of the control cable of a front derailleur of a bicycle, adapted for being mounted on bicycle handlebars. Preferably, the bicycle is a racing bicycle.

BACKGROUND

A bicycle is normally provided with a rear derailleur active on a cogset, which consists of a series of coaxial toothed wheels (sprockets) having different diameters and numbers of teeth coupled with the hub of the rear wheel.

A bicycle can also be provided with a front derailleur associated with a chainset, which consists of a series of toothed wheels (crown gears) having different diameters and numbers of teeth associated with a pin of the bottom bracket driven in rotation by a pair of pedals.

Usually, there are two or three crown gears of the chainset having increasing diameters starting from the crown gear closest to the frame of the bicycle.

The derailleur, whether front or rear, engages a transmission chain extending in a closed loop between the cogset and the chainset, moving it on toothed wheels having a different diameter and number of teeth, so as to obtain different gear ratios.

In particular, downward gearshifting is said when the chain passes from a toothed wheel of larger diameter to a toothed wheel of smaller diameter, and upward gearshifting is said when the chain moves from a toothed wheel of smaller diameter to a toothed wheel of larger diameter. Concerning this, it should be noted that with reference to the front derailleur, downward gearshifting corresponds to the passage to a lower gear ratio and upward gearshifting corresponds to the passage to a higher gear ratio.

The movement in the two directions of a derailleur is obtained through an actuation device mounted on the handlebars so as to be easily maneuvered by the cyclist.

More specifically, in a mechanical gearshift, the front derailleur is moved between the crown gears of the chainset, in a first direction (upwards) by a traction action exerted by an inextensible cable that is normally sheathed (commonly called Bowden cable), in a second opposite direction (downwards) by the release of the traction of the cable and by the elastic return action of a spring foreseen in the derailleur itself.

The front derailleur is actuated by a linkage that actuates a chain guide adapted to physically move the chain between different engagement positions on the crown gears.

The chain guide comprises an inner plate and an outer plate substantially parallel to one another and substantially parallel to the planes on which the crown gears lie. The inner plate is spaced from the outer plate and both are simultaneously and rigidly translated by the traction or by the release of the control cable.

During downward gearshifting, the outer plate of the derailleur intercepts the chain and moves it from the crown gear engaged making it fall onto a smaller crown gear arranged closer to the frame.

During upward gearshifting, the inner plate of the derailleur intercepts the chain and moves it, accompanying it, towards a larger crown gear arranged further from the frame.

A pair of mechanical end stops limits the excursion of the derailleur to prevent it from being able to move the chain too far towards the frame or too far away from the frame (thus ensuring that the chain does not move beyond the crown gears).

In the actuation device, the control cable is actuated in traction or release through winding and unwinding on a rotor element, commonly called cable-winding bush, the rotation of which is actuated by the cyclist with a suitable control lever, or with two control levers (a first lever for upward gearshifting and a second lever for downward gearshifting).

In any case, the actuation device must foresee for the cable-winding bush to be held still in rotation in a number of predetermined angular positions, angularly spaced apart by predetermined indexing angles. This function is obtained with so-called indexers, many types of which are known in the prior art, variously active between the cable-winding bush and the fixed casing of the device.

One type of indexer used to control the front derailleur comprises an indexing bush and a so-called ball-carrying disc, the interaction of which determines the stable obtaining of the predetermined angular positions of the cable-winding bush.

In particular the ball-carrying disc and the indexing bush are fitted on a control shaft set in rotation by the control lever actuated by the cyclist. The ball-carrying disc and the cable-winding bush are constrained in rotation to the control shaft, whereas the indexing bush does not rotate with respect to the control shaft.

On the indexing bush there are two or more stop areas (as a function of the number of crown gears) that engage in respective stable equilibrium positions a ball carried by the ball-carrying disc. Usually, the stop areas are arranged on a circular sector of the indexing bush and are aligned circumferentially on it, in other words they are arranged the same radial distance from the center of the indexing bush. The stop areas are angularly spaced apart by angles coinciding with the indexing angles of the cable-winding bush.

In order to perform upward gearshifting, the cyclist actuates the relative control lever and the control shaft is set in rotation making the ball of the ball-carrying disc carry out an angular rotation with respect to the indexing bush until it reaches a further stop area in which it stops. During such a rotation, the ball-carrying disc and indexing bush move apart, in contrast to the action of a cup spring, through the effect of the axial thrust exerted by the ball that passes over the stop area occupied to occupy a circumferentially next one. Such a rotation of the ball with respect to the indexing bush corresponds to a rotation of the ball-carrying disc and, therefore, of the cable-winding bush. The winding of the control cable on the cable-winding bush determines the translation of the chain guide plates of the derailleur that derail the chain on a crown gear having immediately greater diameter allowing gearshifting.

Similarly, in order to perform downward gearshifting, the cyclist actuates the relative control lever and the control shaft is set in rotation taking the ball of the ball-carrying disc into the stop area immediately preceding in which it stops. Such a rotation of the ball-carrying disc corresponds to a rotation of the cable-winding bush that unwinds the control cable. The release of the control cable determines a translation of the chain guide plates of the derailleur that derail the chain onto the crown gear having a smaller diameter.

Usually, the indexing bush comprises more than one stop area to position the front derailleur at the smallest crown gear. For example, it is possible to foresee three stop areas and in particular a first stop area corresponding to a position of the front derailleur substantially against the lower end stop (in which the control cable has the least pull or is even loosened), a second stop position in which the front derailleur is slightly distanced from the lower end stop and perfectly centered on the smallest crown gear and a third position in which the front derailleur is practically aligned, by the inner plate, with the smallest crown gear.

These three stop areas allow the chain to engage any of the toothed wheels of the rear cogset without it sliding against one of the chain guide plates of the front derailleur. Indeed, it should be noted that the rear cogset has an excursion, in the direction of the rotation axis thereof, of a few centimeters, making the chain more or less askew as a function of the toothed wheel of the cogset engaged.

The cyclist, therefore, actuates the control lever to engage the most appropriate stop area as a function of the toothed wheel of the cogset engaged by the chain when it is on the smallest crown gear of the chainset.

During downward gearshifting from the largest crown gear, the three stop areas do not impede gearshifting, since the chain is pushed by the outer plate of the front derailleur so as to carry out a jump in substantial free fall towards the smallest crown gear of the chainset. Therefore, the third of the aforementioned stop areas can also be sufficient for the outer plate of the derailleur to push the chain by a sufficient amount to make it fall onto the smaller crown gear.

On the other hand, upward gearshifting requires that the inner plate accompanies the chain until it engages the largest toothed wheel.

For this reason, usually, at the positioning of the chain on the largest crown gear there is a single stop area on the indexing bush of the front derailleur, such as to ensure that the derailleur has an effective excursion to engage the chain on the largest crown gear.

SUMMARY

The Applicant has noted that since it is possible to use all of the toothed wheels of the cogset when the chain is on the largest crown gear of the chainset, the distance between the two chain guide plates must be significant to avoid sliding of the chain on the inner plate when the largest toothed wheels of the cogset are engaged.

The Applicant has realized that a shorter distance between the chain guide plates would allow quicker and more precise upward gearshifting. Indeed, a shorter distance between the chain guide plates would allow a more immediate intervention of the inner plate on the chain during upward gearshifting with a consequent quicker and more precise gearshifting.

The Applicant has, however, found that by reducing the distance between the two chain guide plates it would not be possible to effectively use all of the toothed wheels of the cogset when the chain engages the crown gear of greater size of the chainset.

The present invention therefore relates to an actuation device of the control cable of a front derailleur of a bicycle comprising:

a casing, configured for fixing to bicycle handlebars, a cable-winding bush mounted in the casing angularly rotatable about a rotation axis in a first angular direction between a first angular position and a last angular position and in a second angular direction between the last angular position and the first angular position to actuate a front derailleur of a bicycle, a rotating member mounted in the casing in a rotatable manner about the rotation axis and a stationary member mounted in a non-rotatable manner in the casing, wherein one from the rotating member and the stationary member is provided with at least one pointer slidably engaged on a fastening track equipped with a plurality of stop areas provided on the other member, the stationary member or the rotating member provided with said fastening track further comprising at least one further stop area not arranged along said fastening track, said further stop area being engageable by said pointer and being arranged between two successive stop areas of said fastening track, the cable-winding bush passing from between two angular positions following the passage of the pointer between two stop areas.

The term "next" referring to a stop area, in the present description and in the following claims, is meant to indicate a stop position that immediately follows another stop position along the first angular direction.

Rotations of the cable-winding bush in the first angular direction correspond to upward gearshifting operations, whereas rotations of the cable-winding bush in the second angular direction correspond to downward gearshifting operations.

The stop areas arranged along the fastening track on which the pointer slides allow the pointer, and therefore the cable-winding bush, to reach angular positions corresponding to positions of the front derailleur useful for performing gearshifting on the crown gears of the chainset and, preferably, for obtaining many positions of the front derailleur when the transmission chain engages the smallest crown gear of the chainset.

These angular positions of the pointer and of the cable-winding bush are sequentially reachable during gearshifting, for example upwards, when the cyclist actuates the control lever.

In this way, the front derailleur can make the transmission chain go up with precision onto the crown gear having a larger diameter, accompanying it during gearshifting.

The Applicant has realized that by arranging a stop area outside of the fastening track and, therefore, not reachable during the normal sliding of the pointer in the fastening track, it is possible to obtain an angular position of the cable-winding bush, and therefore of the front derailleur, not immediately reachable when the gearshifting operations are carried out following the fastening track.

The Applicant has also realized that by positioning such a further stop area between two successive stop areas of the fastening track it is possible to obtain an angular position of the cable-winding bush, and therefore of the front derailleur, that is intermediate, for example, between the stop area along the fastening track that positions the front derailleur on the largest toothed wheel and the stop area along the fastening track immediately preceding (for example useful, during downward gearshifting, for positioning the transmission chain on a smaller crown gear).

In this way, the stop area outside of the fastening track can be used to move the front derailleur by an amount not sufficient to perform downward gearshifting but sufficient to reposition the derailleur at the largest crown gear to compensate for different positioning of the transmission chain on the toothed wheels of the cogset.

The size of the front derailleur, and in particular the distance between the two chain guide plates, can therefore be decreased without compromising the possibility of using the entire cogset when the transmission chain is on the largest crown gear of the chainset.

BRIEF DESCRIPTION OF THE DRAWING(S)

Further features and advantages of the invention will become clearer from the following description of preferred embodiments thereof, made with reference to the attached drawings. In such drawings.

DETAILED DESCRIPTION OF THE PREFERRED EMBODIMENT(S)

Figure 1:
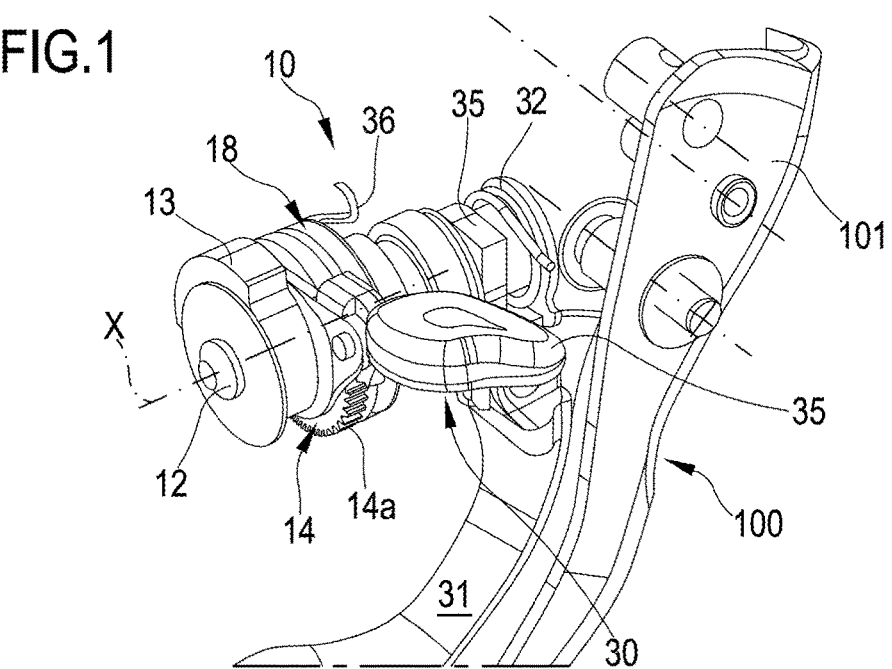
FIG. 1 is a perspective view, with some parts removed to better highlight others of an actuation device of the control cable of a front derailleur of a bicycle according to the invention.

The actuation device of the control cable of a front derailleur of a bicycle of the present invention can comprise one or more of the following preferred features, considered individually or in combination.

In the casing configured for fixing to bicycle handlebars there is a central pin, fixed with respect to the casing and extending along an axis. Such an axis is the main reference axis for the elements that form part of the device of the present invention; all of the indications of direction and similar, such as "axial", "radial", "circumferential" and "diametral" will refer to it; equally, the indications "outwards" and "inwards" referring to radial directions should be understood as away from the axis or towards the axis. The two opposite angular directions are also defined about the axis. Preferably, such an axis coincides with the rotation axis of the cable-winding bush.

Preferably, said last angular position of the cable-winding bush corresponds to a last stop area arranged along said fastening track and said first angular position of the cable-winding bush corresponds to a first stop area along said fastening track; said further stop area being arranged between the last and the penultimate stop area along said fastening track.

In this way, the further stop area follows, in downward gearshifting, the angular position of the cable-winding bush in which the pull of the control cable is maximum. Such a position of the cable-winding bush (maximum pull of the control cable) indeed corresponds to the position of the derailleur at the largest crown gear of the chainset.

Preferably, said further stop area is reachable by said pointer during a rotation of the cable-winding bush along the second angular direction and not being reachable by said pointer during a rotation of the cable-winding bush along the first angular direction.

As stated, the rotation of the bush along the second angular direction corresponds to downward gearshifting. Therefore, the further stop area is reachable only during downward gearshifting from the angular position of the cable-winding bush that determines the maximum pull of the control cable.

In this way, when the cyclist actuates the control lever to carry out upward gearshifting to take the transmission chain onto the largest crown gear of the derailleur, the further stop area is not reached (and is jumped) ensuring that the transmission chain lifts effectively onto the largest crown gear.

The Applicant has indeed realized that a possible passage of the slider on the further stop area (the one outside of the fastening track) during upward gearshifting might not allow the transmission chain to reach the largest crown gear since the inner plate of the derailleur might not be able to move the transmission chain sufficiently. The comfort of the cyclist and the responsiveness of gearshifting would thus be compromised.

Preferably, said stop areas along the fastening track and said further stop area are equally radially spaced with respect to said rotation axis.

Preferably, the radially equidistant position of all of the stop areas creates an alternative path along a hypothetical arc of circle able to be crossed by the pointer. In this way, an alternative path is created for the pointer that foresees passages between the stop areas different from the path offered by the fastening track.

Due to what has been stated above, the alternative arc of circle path is preferably followed by the pointer during rotations of the cable-winding bush along the second angular direction, in other words during downward gearshifting, whereas the path along the fastening track is preferably followed during rotations along the first angular direction of the cable-winding bush, in other words during upward gearshifting.

Preferably, said fastening track comprises a plurality of loops, which define said stop areas along said fastening track, and a plurality of free sliding paths each of which extends between two consecutive loops.

Preferably, said free sliding paths comprise a substantially rectilinear portion that extends in a radially inner direction from one loop up to a next loop.

The extension of the rectilinear portions of the free sliding paths is proportional to the angular distance between the two stop areas joined by it.

Preferably, said loops define circumferential shoulders for said pointer during a rotation of the cable-winding bush along said second angular direction.

In this way, during downward gearshifting the pointer is forced to pass over the stop areas to follow the rotation imposed by the cable-winding bush.

Such passing over carries the pointer on the aforementioned alternative arc of circle path, allowing the pointer to reach the other stop areas and also the stop area arranged outside of the fastening track.

Preferably, said loops comprise respective facilitating ramps for said pointer during a rotation of the cable-winding bush along said first angular direction.

Such facilitating ramps allow the pointer to leave a stop area and to insert in the free sliding path following the fastening track during rotations along the first angular direction of the cable-winding bush, in other words during upward gearshifting.

Preferably, said free sliding paths comprise a stop shoulder arranged close to a respective loop; said stop shoulder being able to be passed over by said pointer during a rotation of the cable-winding bush along said first angular direction and being unable to be passed over by said pointer during a rotation of the cable-winding bush along said second angular direction.

In this way, even if the pointer tends to slide along the circumferential shoulder of a loop during a rotation of the cable-winding bush along the second angular direction, the stop shoulder would avoid the pointer being able to cross the free sliding path in reverse, making the alternative arc of circle path the only path able to be followed by the pointer during downward gearshifting.

Preferably, the further stop area is arranged between two successive loops and radially outside of the respective free sliding path that joins said two loops.

In the preferred embodiment of the invention, said stationary member or rotating member provided with at least one pointer comprises a second pointer angularly spaced by 180° from the first pointer;

the stationary member or the rotating member provided with said fastening track comprises a further fastening track equipped with a respective plurality of stop areas and at least one respective further stop area not arranged along said further fastening track, said fastening tracks, the respective stop areas and the two further stop areas not arranged along the fastening tracks are the same and point-for-point diametrically opposite, the cable-winding bush passes from one angular position to an adjacent angular position following the simultaneous passage of each pointer from one stop position to an adjacent stop position.

Therefore, identical stop areas are angularly spaced by 180° and engaged by two pointers also angularly spaced by 180°. In this way, the distribution of forces transmitted between the pointers and the fastening track is spread optimally, increasing the reliability of the device and the precision of operation.

For what has been stated, the number of stop areas of the two fastening tracks is the same and is equal to the number of angular positions of the cable-winding bush minus one. The further angular position of the cable-winding bush is given by the further stop areas outside of the fastening tracks that, as stated, are simultaneously engaged by the two pointers.

Preferably, the device comprises a ball-carrying disc comprising a first and a second substantially rectilinear throat, extending radially and angularly separated by 180°, the first and the second throat slidably receiving a respective pointer.

Preferably, an elastic member active on the pointer to push it radially externally is housed in each throat. The pointer moves back, in contrast to the elastic force exerted by the elastic member to follow the fastening track.

Preferably, said first and second pointers emerge axially from said throats to slidably engage a respective fastening track.

In the preferred embodiment of the invention, said fastening track is formed on said stationary member and said member mobile comprises a ball-carrying disc on which said pointers are slidably foreseen.

Referring now to the attached figures, a preferred embodiment of an actuation device of the control cable for the front derailleur of a bicycle in accordance with the present invention, wholly indicated with 10, is described in detail.

Preferably, the actuation device 10 is included in an integrated brake-gearshift actuation device 100 of the bicycle, as shown for example in FIG. 1.

The attached figures show the actuation device 10 of the control cable used to change the gear ratios on a chainset 200 through a front derailleur 300 of the bicycle.

The device 10 comprises a casing 11 (FIG. 2), which is fixed to the bicycle handlebars in a conventional manner, for example through a strap (not illustrated) that preferably also constrains a brake lever 101 to the handlebars (FIG. 1).

In the casing 11 there is a central pin 12, rotatable inside the casing 11 about a rotation axis X. The rotation axis X (as will be described hereinafter) is the main reference axis for the elements that form part of the device 10; all of the indications of direction and similar, such as "axial", "radial", "circumferential" and "diametral" will refer to it; equally, the indications "outwards" and "inwards" referring to radial directions should be understood as away from the rotation axis X or towards the rotation axis X. Two opposite angular directions are also defined about the rotation axis X—a first A and a second angular direction B, respectively.

The device 10 comprises a cable-winding bush 13, to which the control cable is fixed and on which it is wound. The cable-winding bush 13 is mounted in the casing 11 and is angularly rotatable about the rotation axis X in the first A and in the second angular direction B. The cable-winding bush 13 can rotate between a first angular position, in which the winding of the control cable is minimum, and a last angular position, in which the winding of the control cable is maximum, and vice-versa.

Between the first angular position and the last angular position of the cable-winding bush 13 there are further intermediate angular positions that are distinct from one another and angularly spaced by indexing angles. The indexing angles are not all identical to each other. Preferably, the indexing angles are all different from one another. Each angular position of the cable-winding bush 13 corresponds to an angular position of the front derailleur 300 with respect to the crown gears 201, 202 of the chainset 200.

FIGS. 5 to 8 schematically illustrate some of such positions that the front derailleur 300 can take up with respect to the two crown gears 201, 202.

In particular, the first angular position of the cable-winding bush 13 corresponds to a positioning of the transmission chain at the smallest toothed wheel 201 of the chainset 200. The last angular position of the cable-winding bush 13 corresponds to a positioning of the transmission chain at the largest toothed wheel 202 (in other words having a larger diameter) of the chainset 200.

The cable-winding bush 13 rotates as a unit with the central pin 12.

Figure 4:
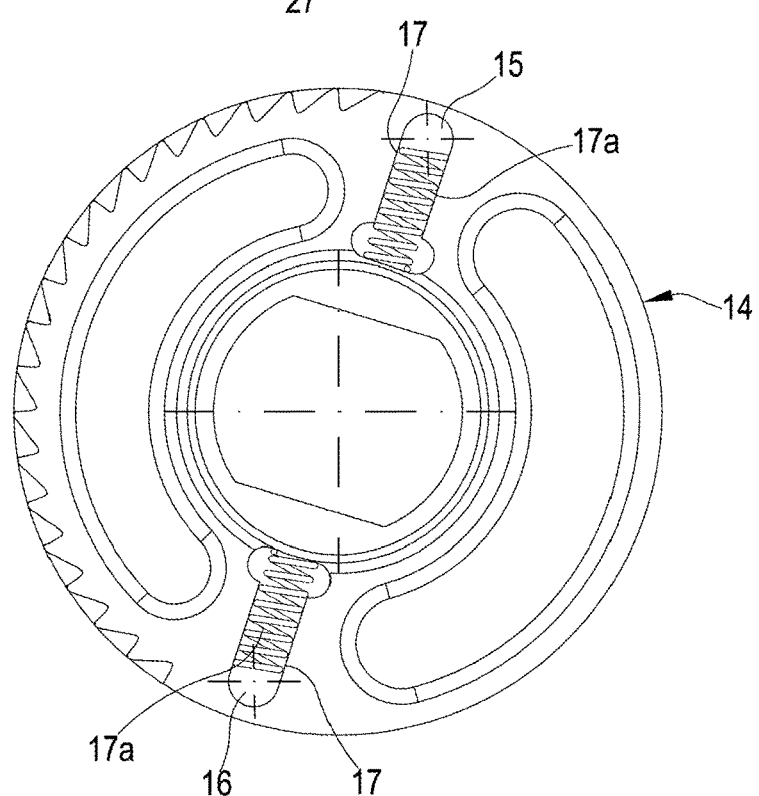
Figure 5:
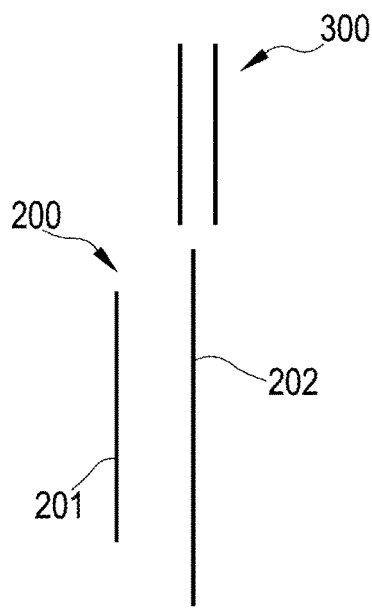
FIGS. 5 to 8 are schematic views of the positions of a front derailleur, actuated by the device of the present invention, with respect to a chainset.
Figure 6:
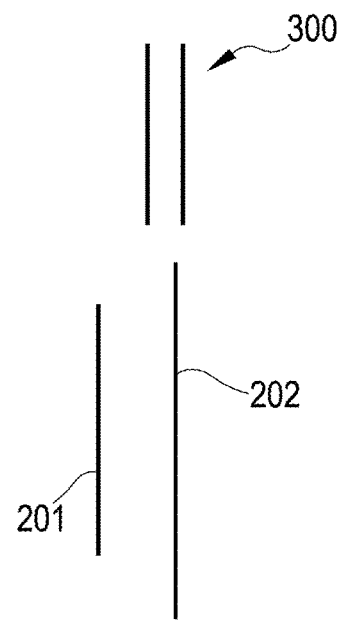
Figure 7:
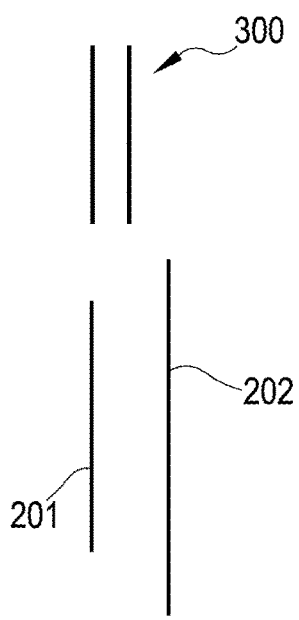
Figure 8:
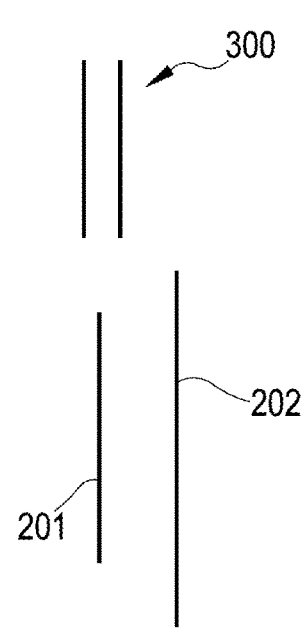

The device 10 further comprises a rotating member 14 that is rotatably mounted in the casing 11 about the rotation axis X. The rotating member 14 is fixedly connected to the pin 12 and each rotation of the rotating member corresponds to an identical rotation of the cable-winding bush 13. Preferably, the rotating member 14 is a substantially cylindrical ball-carrying disc equipped with a first pointer 15 and a second pointer 16 (FIG. 4). The two pointers 15, 16 are preferably spherical bodies and, in the rest of the present description will be called pointers or balls without distinction.

The ball-carrying rotating member or disc 14 has two radial throats 17, see FIG. 4, formed in it that are closed towards the outside, the same and diametrically opposite, in each of which a respective ball 15, 16 is housed in a mobile manner. The two balls 15, 16 are elastically biased outwardly in the radial throats 17 by respective springs 17a mounted in the throats 17. Alternatively, the balls 15, 16 may be biased towards the outside of the throats 17 by leaf springs (not illustrated) mounted in the ball-carrying disc 14. In both cases the springs position the balls 15, 16 at the radial end of the respective throat 17. The throats 17 are open on one side of the ball-carrying disc so that the balls partially emerge from the axial bulk of the ball-carrying disc 14, making pointers projecting in the axial direction.

Figure 2:
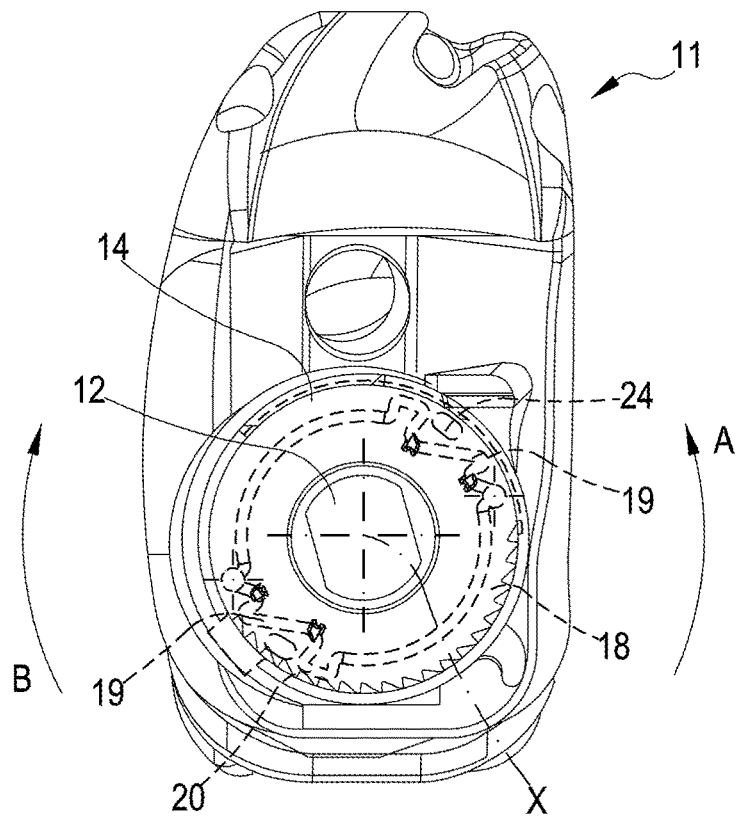
FIG. 2 is a rear view with some parts removed to better highlight others of the device of FIG. 1.
Figure 3:
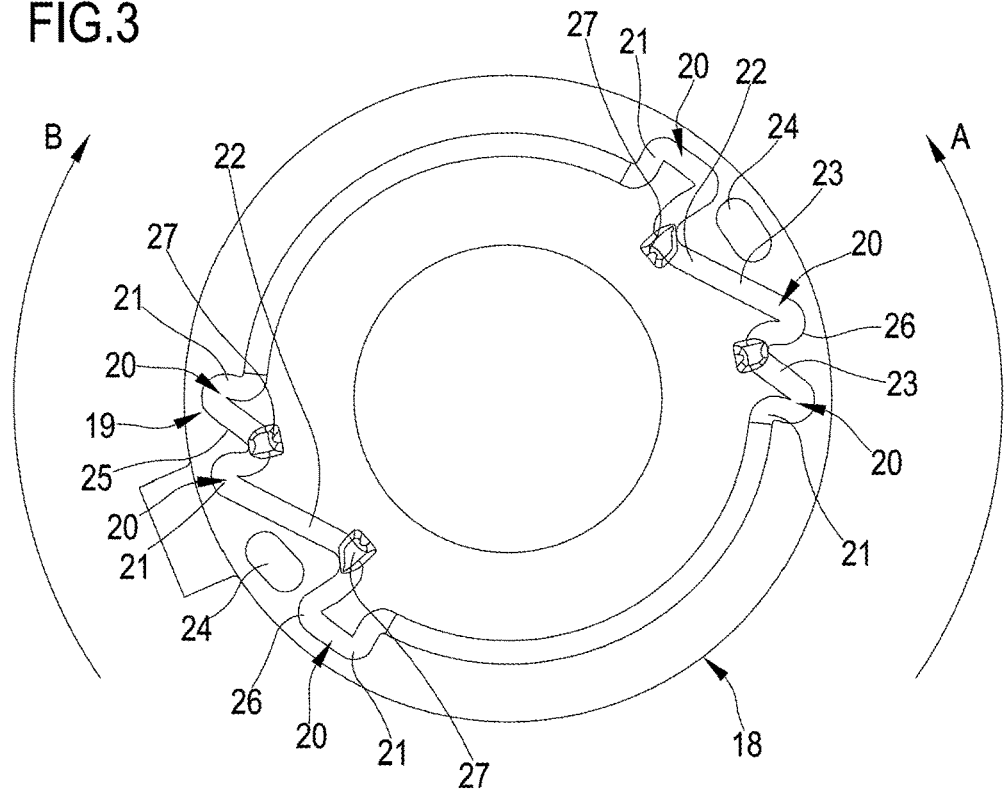
FIGS. 3 and 4 are schematic plan views of some details of the device of FIG. 1.

Inside the casing 11 a stationary member 18, see FIGS. 1-3, is provided with two fastening tracks 19, and is also mounted in a non-rotatable manner and fixed with the casing 11 itself. The stationary member 18 is preferably an indexing bush 18. The two pointers 15, 16 are engaged on a respective fastening track 19.

Each fastening track 19 directly faces the ball-carrying disc 14 so that the pointers 15, 16 engage the respective fastening track 19. The depth of each fastening track 19 is such as to receive the portion of pointers 15, 16 that emerges axially from the ball-carrying disc 14.

Each fastening track 19 comprises respective stop areas 20 engageable in sequence by the two pointers 15, 16.

The stop areas 20 determine stable positions of the pointers along the fastening track 19.

The two fastening tracks 19 are identical to each other and angularly spaced by 180°, so that identical stop areas 20 are angularly spaced by 180°, as schematized in FIG. 3.

The stop positions 20 are defined by a plurality of loops 21 of the fastening track 19 and are joined by a plurality of free sliding paths 22 each of which extends between two consecutive loops 21.

The free sliding paths 22 comprise a substantially rectilinear portion 23 that joins two consecutive loops 21. The substantially rectilinear portion 23si extends radially towards the inside of the indexing bush 18, joining the end part of a loop 21 with the initial part of a next loop 21.

The fastening track 19 is delimited by a continuous outer peripheral margin, regularly indented by the presence of the succession of loops 21 that define the stop areas 20 and of the free sliding paths 22, and by a similar inner margin.

Following the simultaneous passage of each pointer 15, 16 from one stop area to an adjacent stop area, the cable-winding bush 13 performs a corresponding rotation between two adjacent angular positions.

The angular distance that separates each stop area 20 from an adjacent stop area 20 is angularly separated by a respective indexing angle identical to the corresponding indexing angle that separates two corresponding angular positions of the cable-winding bush 13.

Preferably, the indexing angles that separate the stop areas from each other are different from each other, just as the indexing angles that separate the angular positions of the cable-winding bush 13 from each other are different from one another.

On the indexing bush 18 there is also a further stop area 24 at each fastening track 19. The further stop area 24 is arranged outside of the respective fastening track 19, in other words it cannot be reached by crossing the fastening track 19.

Each further stop area 24 is arranged between two loops 21 of the respective track. In the example illustrated in FIG. 3, a further stop area 24 is provided between the last loop 21 and the penultimate loop 21 along the first angular direction A. The further stop area 24 is arranged radially outside of the free sliding path 22 that joins the penultimate loop to the last loop 21.

The stop areas 20 and the further stop area 24 are arranged radially the same distance from the center of the indexing bush 18, so as to all be aligned along a hypothetical circumference or arc of circumference.

Structurally, the further stop area 24 is made from a throat on the surface of the indexing bush 18 having the same axial depth as the stop areas 20 and delimited by a substantially circumferential or substantially oval edge.

Angular rotations of the cable-winding bush 13 in the first angular direction A correspond to upward gearshifting operations of the front derailleur 300 and rotations of the cable-winding bush 13 in the second angular direction B correspond to downward gearshifting operations of the front derailleur 300.

Concerning this, the device 10 comprises a maneuvering mechanism 30 operative on the central pin 12 to obtain upward or downward gearshifting.

The maneuvering mechanism 30 comprises a first control lever 31 (FIG. 1), angularly mobile about the rotation axis X in the first angular direction A between a rest position and an active position, and angularly mobile about the rotation axis X in the second angular direction B between the active position and the rest position.

Preferably, the first control lever 31 allows only upward gearshifting to be performed.

For this purpose, the maneuvering mechanism 30 comprises an engagement bush 32 rotating as a unit with the cable-winding bush 13 and on which the first control lever 31 acts. The first control lever 31 rotates as a unit with the engagement bush 32 in the passage from the rest position to the active position and is freely rotatable with respect to the engagement bush 32 in the passage from the active position to the rest position.

In particular, the engagement bush 32 is substantially cylindrical and comprises a toothed sector that extends radially outside of the engagement bush 32.

When the first control lever 31 is set in rotation in the first angular direction A, it engages the toothed sector and sets the engagement bush 32 in rotation in the first angular direction A.

When the first control lever 31 rotates in the second angular direction B, it is not able to pull the toothed sector in rotation making a return stroke in rest position without rotation of the engagement bush 32.

Elastic members 33 are active between the first control lever 31 and the casing 11, to take the first control lever 31 back into the rest position. Such elastic members 33 are a torsion spring, mounted in the casing 11 coaxially to the central pin 12 and constrained at one end to the casing 11 and at the other to the first control lever 31.

The connection linkage between first control lever 31 and engagement bush 32 is per se conventional and therefore will not be described in further detail.

The maneuvering mechanism 30 further comprises a second control lever 35 (FIG. 1), which acts on the ball-carrying disc 14 to allow a rotation, together with the cable-winding bush 13, in the second angular direction B about the rotation axis X, so as to obtain downward gearshifting.

The second control lever 35 acts on a spike (not illustrated) that acts on teeth 14a arranged radially externally on the ball-carrying disc 14.

By actuating the second control lever 35, the pawl sets the ball-carrying disc 14 in rotation in the second angular direction B. Once downward gearshifting has taken place, the second control lever 35 and the pawl go back into the initial position by effect of elastic members 36, for example a torsion spring.

The mechanism of the downward gearshifting that uses the second control lever 35, pawl and toothed sector 14a assembly is of the conventional type and is not described any further.

During upward gearshifting, the ball-carrying disc 14 rotates with respect to the indexing bush 18 in the first angular direction A and the two pointers 15, 16 slide in the fastening track along a respective free sliding path 22 that extends between two stop areas 20. When the pointers 15, 16 reach the stop area, the traction of the control cable moves the front derailleur 300 with respect to the crown gear of the chainset 200.

In the preferred embodiment of the invention, the crown gears 201, 202 of the chainset 200 are two in number (as schematized in FIGS. 5 to 8). The stop areas 20 along the fastening track 19 are three in number (as shown in FIG. 3).

The first angular position of the cable-winding bush 13, to which the engagement of the pointers 15, 16 in the first stop areas 20 of the respective fastening tracks 19 corresponds, corresponds to a positioning of the front derailleur 300 at the smallest crown gear 201. The front derailleur 300 is in the position up against a lower end stop of the derailleur itself that prevents the derailleur from being able to make the transmission chain skip beyond the smallest crown gear 201 (as schematized in FIG. 8). This angular position of the cable-winding bush 13 allows, for example, the engagement of the smallest crown gear 201 with the larger toothed wheels of the cogset without there being sliding of the transmission chain against the plates of the front derailleur 300.

Performing upward gearshifting, the ball-carrying disc rotates in the first angular direction A (together with the cable-winding bush 13) and the pointers 15, 16 are positioned at the second stop area 20 of the respective fastening track 19.

In particular, the pointers 15, 16 meet a facilitating ramp 25 at the union between a respective loop 21 and the relative free sliding section 22 and insert onto the latter to reach the next loop 21 where they position themselves. The pointers 15, 16 slide radially inside the throats 17, in contrast to the springs 17a to follow the fastening track 19.

Once the first upward gearshifting operation has taken place, the angular position taken up by the cable-winding bush 13 corresponds to a position of the front derailleur 300 still at the smallest crown gear 201 of the chainset 200 but further from the lower end stop (as schematized in FIG. 7), so that the smallest crown gear 201 is engaged with the smallest toothed wheels of the cogset without there being sliding of the transmission chain against the plates of the front derailleur 300.

Performing a further upward gearshifting operation, the ball-carrying disc rotates in the first angular direction A (together with the cable-winding bush 13) and the pointers 15, 16 are positioned at the last stop area 20 of the respective fastening track 19. This angular position of the cable-winding bush 13 corresponds to a position of the front derailleur 300 at the largest crown gear 202 of the chainset 200 (as schematized in FIG. 5). This upward gearshifting allows the front derailleur to intercept the transmission chain and derail it on the largest crown gear, accompanying it in such passage. In this position of the front derailleur, the crown gear can effectively be engaged with the smallest toothed wheels of the cogset without there being sliding of the plates of the front derailleur 300 against the transmission chain.

The last stop area 20 of the fastening tracks 19 has an elongated shape in the circumferential direction with respect to the other stop areas 20 to allow the cable-winding bush 13 to perform an extra stroke that ensures the maximum pull of the control cable and safe upward gearshifting onto the largest crown gear.

During upward gearshifting, the pointers 15, 16 do not engage the further stop area 24 arranged outside of the fastening track 19.

During downward gearshifting, the pointers 15, 16 cannot follow the free sliding paths 22 in a rotation in the second angular direction B of the ball-carrying disc 14, since they find a shoulder 26 given by the loop 21 that opposes the sliding of the sliders along the fastening track 19.

The rotation of the sliders 15, 16 in the second angular direction B is further impeded by stop shoulders 27 arranged on the free sliding paths 22. Such a stop shoulder 27, conversely, can be passed over by the pointer during a rotation along the first angular direction A.

In this way, during downward gearshifting the pointers 15, 16 are forced, under the action of the cable-winding bush 13, to pass over the respective stop areas 20 to follow the rotation imposed by the cable-winding bush 13. The disengagement of the pointers 15, 16 from the fastening track 19 takes place in opposition to an elastic force exerted by an elastic member (not illustrated) that presses the ball-carrying disc 14 axially against the indexing bush 18.

Such passing over carries the pointers 15, 16 to be arranged in radially outer position in the throats 17 of the ball-carrying disc 14 and to follow a circumferential trajectory when the cable-winding bush 13 rotates along the second angular direction B. The pointers 15, 16 thus move on an alternative path to the fastening track 19. The radially outer position of the pointers 15, 16 in the throats 17 coincides with the radial position of the stop areas on the fastening track 19 and with the radial position of the further stop area 24.

When downward gearshifting is performed from the last angular position of the cable-winding bush 13 (in which the front derailleur positions the transmission chain on the largest crown gear 202), the pointers 15, 16 reach the respective further stop areas 24.

In this angular position of the cable-winding bush 13, the front derailleur 300 is arranged at the largest crown gear 202 of the chainset 200, so that the transmission chain continues to be coupled with the largest crown gear 202. In particular, the front derailleur 300 is in a position closer, with respect to the last angular position of the cable-winding bush 13, to the smallest crown gear 201 (as schematized in FIG. 6). This angular position of the cable-winding bush 13 allows the engagement of the largest crown gear 202 with the largest toothed wheels of the cogset without there being sliding of the transmission chain against the plates of the front derailleur 300.

Performing a further downward gearshifting operation, the pointers 15, 16 are positioned in the second stop area 20 moving the front derailleur 300 so that it positions the transmission chain on the smallest crown gear 201.

From what has been stated above, the cyclist cannot reach the further stop area 24 during upward gearshifting but only during downward gearshifting.

In an embodiment that is not illustrated, there can be a fastening track with many stop areas useful for actuating a chainset having three crown gears. In this case, there can be two further stop areas for each fastening track (instead of the single further stop area described above), wherein each further stop area is arranged immediately before, along the first angular direction, the stop area on the fastening track corresponding to actual gearshifting on a larger crown gear with respect to the one with a smaller number of teeth.

Of course, those skilled in the art can bring numerous modifications and variants to the invention described above, in order to satisfy specific and contingent requirements, like for example foreseeing a plurality of further consecutive stop areas to move the front derailleur further towards the smallest crown gear, maintaining the engagement of the transmission chain on the largest crown gear, all in any case encompassed by the scope of protection of the present invention as defined by the following claims.

What is claimed is:

1. An actuation device of a control cable of a front derailleur of a bicycle, comprising:
   a casing, configured for fixing to bicycle handlebars,
   a cable-winding bush mounted in the casing angularly rotatable about a rotation axis (X) in a first angular direction (A) between a first angular position and a last angular position and in a second angular direction (B) between the last angular position and the first angular position to actuate a front derailleur of a bicycle,
   a rotating member mounted in the casing about the rotation axis (X) and a stationary member mounted in the casing, wherein one from the rotating member and the stationary member is provided with at least one pointer slidably engaged on a fastening track equipped with a plurality of stop areas provided on the other of the rotating member and the stationary member,
   the stationary member or the rotating member provided with said fastening track further comprising at least one further stop area not arranged along said fastening track,
   said further stop area being engageable by said pointer and being arranged between two successive stop areas of said fastening track,
   the cable-winding bush passing between two angular positions following the passage of the pointer between two stop areas.

2. The actuation device according to claim 1, wherein said last angular position of the cable-winding bush corresponds to a last stop area arranged along said fastening track and said first angular position of the cable-winding bush corresponds to a first stop area along said fastening track; said further stop area being arranged between the last and the penultimate stop area along said fastening track.

3. The actuation device according to claim 1, wherein said further stop area is reachable by said pointer during a rotation of the cable-winding bush along the second angular direction (B) and not being reachable by said pointer during a rotation of the cable-winding bush along the first angular direction (A).

4. The actuation device according to claim 1, wherein said stop areas along the fastening track and said further stop area are equally radially spaced with respect to said rotation axis (X).

5. The actuation device according to claim 1, wherein said fastening track comprises a plurality of loops, which define said stop areas along said fastening track, and a plurality of free sliding paths each of which extends between two consecutive loops.

6. The actuation device according to claim 5, wherein said free sliding paths comprise a substantially rectilinear portion that extends in a radially inner direction from one loop up to a next loop.

7. The actuation device according to claim 5, wherein said loops define circumferential shoulders for said pointer during a rotation of the cable-winding bush along said second angular direction (B).

8. The actuation device according to claim 5, wherein said free sliding paths comprise a stop shoulder arranged near to a respective loop; said stop shoulder being able to be passed over by said pointer during a rotation of the cable-winding bush along said first angular direction (A) and not being able to be passed over by said pointer during a rotation of the cable-winding bush along said second angular direction (B).

9. The actuation device according to claim 5, wherein said further stop area is arranged between two successive loops and radially outside of the respective free sliding path that joins said two loops.

10. The actuation device according to claim 1, wherein:
    said stationary member or rotating member provided with at least one pointer comprises a second pointer angularly spaced by 180° from the at least pointer;
    the stationary member or the rotating member provided with said fastening track comprises a further fastening track equipped with a respective plurality of stop areas and at least one respective further stop area not arranged along said further fastening track,
    said fastening tracks, the respective stop areas and the two further stop areas not arranged along the fastening tracks are identical and point-for-point diametrically opposite,
    the cable-winding bush passes from one angular position to an adjacent angular position following the simultaneous passage of each pointer from one stop position to an adjacent stop position.

11. The actuation device according to claim 1 comprising a ball-carrying disc comprising a first and a second substantially rectilinear throat extending radially and angularly separated by 180°, the first and the second throat slidably receiving a respective pointer.

12. The actuation device according to claim 11, wherein said at least one pointer and said second pointer emerge axially from said throats to slidably engage a respective fastening track.

13. The actuation device according to claim 1, wherein said fastening track is formed on said stationary member and a mobile member comprises a ball-carrying disc on which said pointers are slidably provided.

14. The actuation device according to claim 1, wherein a number of stop areas of each fastening track is equal to a number of angular positions of the cable-winding bush minus one.

* * * * *